J. KELSEY.
SECURING MEANS FOR SPLIT TIRE HOLDING RIMS.
APPLICATION FILED APR. 9, 1914.
1,311,126.
Patented July 22, 1919.
2 SHEETS—SHEET 1.
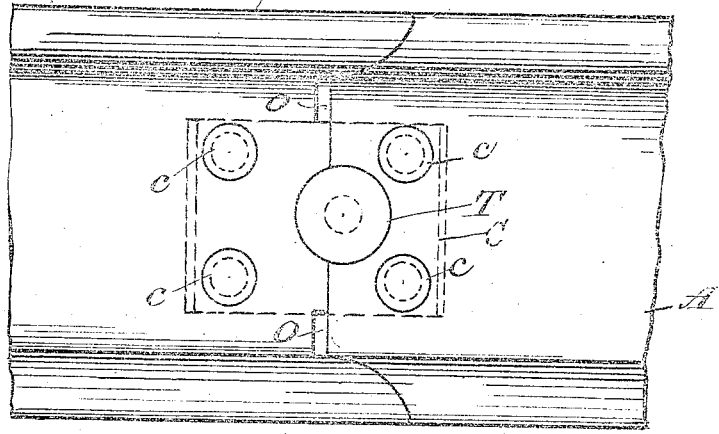
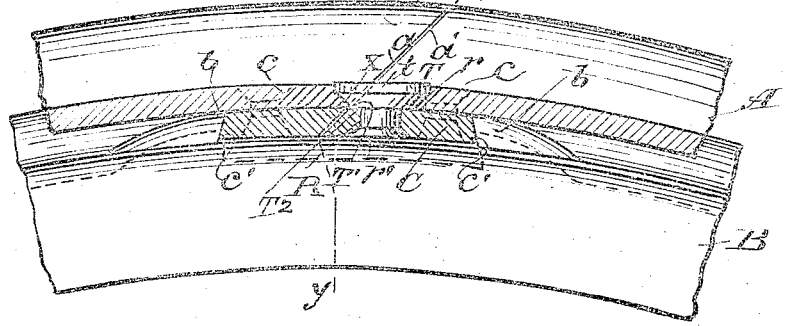
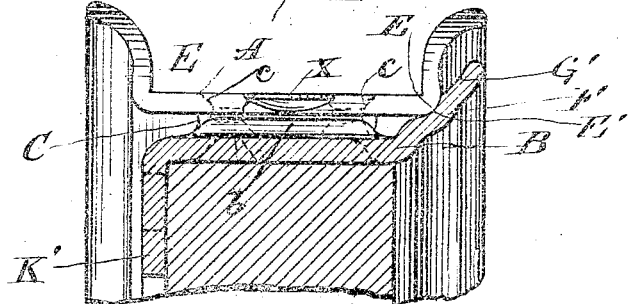
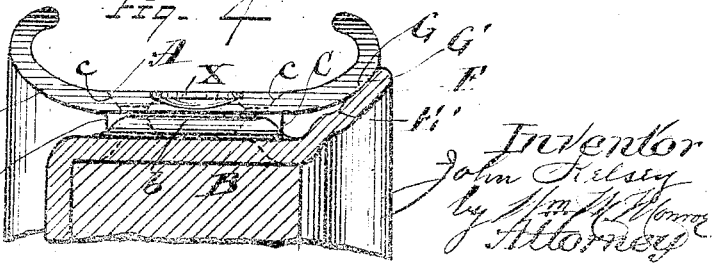
Witnesses
Inventor
John Kelsey
by Wm H Monroe
Attorney

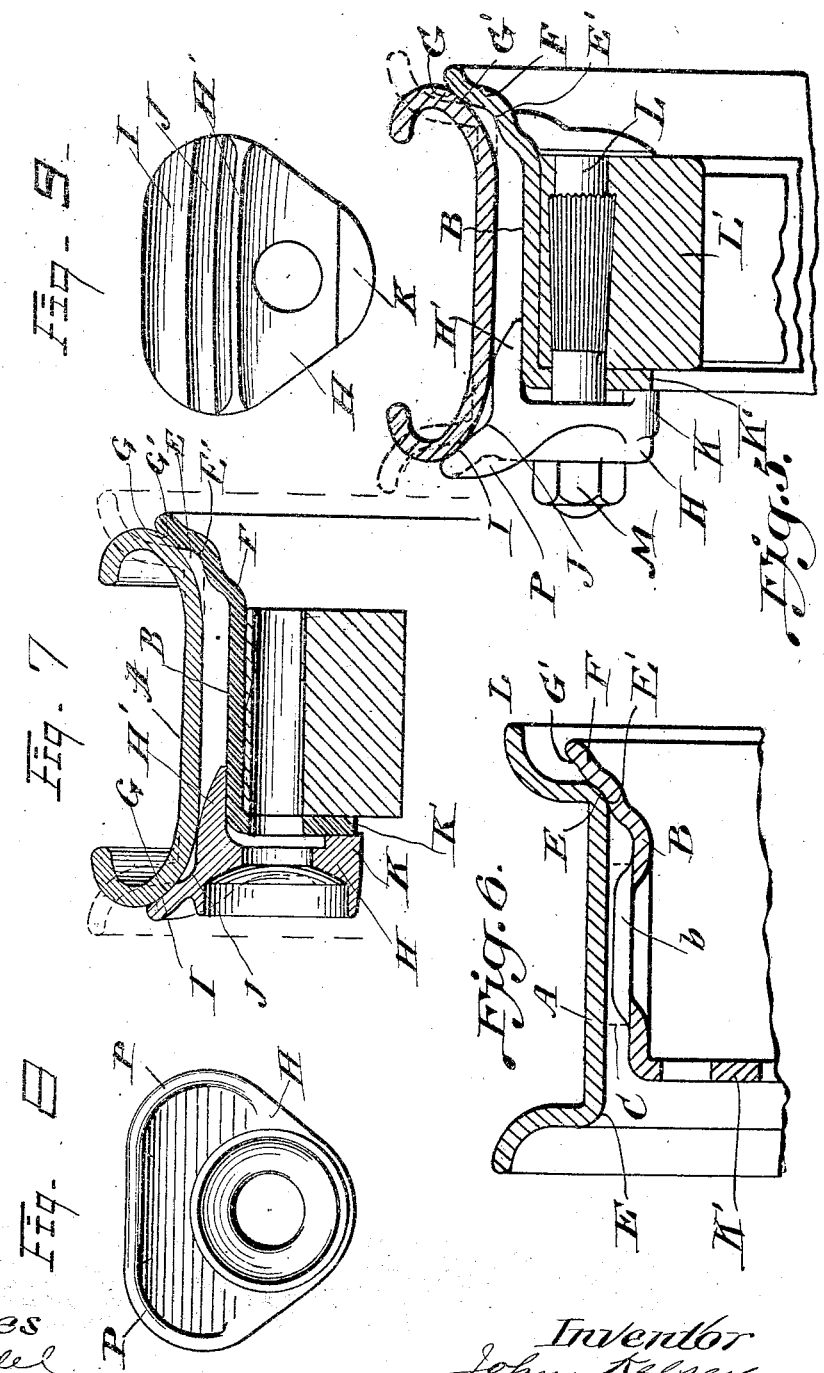

UNITED STATES PATENT OFFICE.

JOHN KELSEY, OF DETROIT, MICHIGAN, ASSIGNOR TO KELSEY WHEEL COMPANY, INC., OF DETROIT, MICHIGAN, A CORPORATION OF NEW YORK.

SECURING MEANS FOR SPLIT TIRE-HOLDING RIMS.

,311,126.

Specification of Letters Patent.

Patented July 22, 1919.

Application filed April 9, 1914. Serial No. 830,779.

*To all whom it may concern:*

Be it known that I, JOHN KELSEY, a citizen of the United States, and resident of Detroit, in the county of Wayne and State of Michigan, have invented certain new and useful Improvements in Securing Means for Split Tire-Holding Rims; of which I hereby declare the following to be a full, clear, and exact description, such as will enable others skilled in the art to which it appertains to make and use the same.

The objects of the invention are to provide a split tire holding rim and means for detachably securing the same to the felly band of an automobile wheel in such a manner as to prevent circumferential displacement of the extremities of the rim relatively to each other and to the felly band.

Further objects of the invention are to provide an improved form of construction of the felly band permitting the application interchangeably thereto of rims having standard clencher flanges and of rims having straight side flanges, and adapted to secure straight sided tires having a 10% over capacity, that is, it is adapted to use with the rim for a straight sided tire having a wider base than that of the standard size without alteration of the felly rim.

The invention comprises a split rim having inclined over-lapping extremities and interlocking devices for the rim and felly band and for the overlapping extremities of the rim and also the peculiar conformation of the felly band to adapt it to interchangeable use, as hereinafter further described, shown in the accompanying drawings, and specifically pointed out in the claims.

In the accompanying drawings Figure 1 is a plan view of the completed joint formed between the extremities of the rim showing straight side flanges; Fig. 2 is a longitudinal central section thereof and of the felly band; Fig. 3 is a transverse section of the rim and felly band at *y—y* Fig. 2, showing one extremity of the rim and straight side flanges; Fig. 4 is a transverse section of the felly band showing one extremity of the rim and recess therein and showing clencher flanges; Fig. 5 is a transverse section of the felly band showing a clencher rim mounted thereon, and showing the position of a straight side rim in dotted lines; Fig. 6 shows a transverse section of the felly band showing the elevations therein;

Fig. 7 is a transverse section of the rim and felly band and clamped;

Fig. 8 is a face view of the clamp;

Fig. 9 is a view of the inner side of the clamp.

In these views A is the rim, B the felly band. The rim is diagonally cut to form inclined overlapping surfaces *a* and *a'*.

Before making the divisional cut a rigid plate or member C is attached to the underside of the rim by rivets *c*, *c*, or may be made integral with the rim if desired by depressing the same, and afterward the diagonal cut is made extending through the rim and its side flanges and through the member C.

The plate is provided with slightly extending lower extremities *c'*, *c'*, and projecting integrally from the substance of the felly band are corresponding elevations *b*, *b*, the opposed outer edges of which are extended so as to be capable of entering between the extended edges of the plate C in the manner of dovetails and of interlocking therewith when the ends of the rim are brought together and moved laterally into place upon the felly band. The engaging edges of the plate C and elevations *b*, *b* are preferably reversely inclined so as to form the dovetail gripping means aforesaid which effectually prevents circumferential movement of the rim upon the felly band.

Before the diagonal cut is made through the rim A and place C a rivet hole R is made in the rim and plate, the diagonal cut is then made through the rim and plate and the parts are rigidly held together while a larger countersunk opening *r* is made in the rim from above, which extends to the line of the divisional cut, and overlapping both portions of the rim.

A smaller countersink is made in the member C on the underside at *r'* in the inner end of the rivet hole.

A rivet T of corresponding shape to the opening is then put in place and when the extremities of the rim are brought together the larger head *t* of the rivet will enter the large countersink *r* one portion extending also into the depression X. The rivet T is provided with an annular shoulder T' which rests upon a shoulder T² at the bottom of the large countersink. The head of the rivet is smooth and extends preferably a trifle above the surface of the rim.

In this position the rim is moved into assembled position upon the felly band and its ends are locked from movement both circumferentially and laterally upon the felly band and are prevented from springing outward by the dovetail construction of the interlocking plate and elevations upon the felly band. The plate C also serves to act as a driving plate for the rim.

Openings O, O in the rim at the overlapping joint permit the insertion of a tool to relax the tire.

The clencher and straight side rims are as stated interchangeably placed upon the same felly band. Provision of this adjustment is made by giving a definite separate seat for each type of rim upon the felly band.

In Figs. 6 and 7 a rim provided with straight side flanges R, R, is shown and one curved annular edge E engages the annular recess E' upon the flange F of the band. These recesses are spaced apart to receive a tire having a wider base than the standard size, suitable to support a straight sided tire having 10% greater capacity than the standard size.

A second annular recess G' upon the flange F of the felly band receives the curved edge of the standard clencher rim at G.

Both rims fit interchangeably upon the band at an equal distance therefrom. Clamps H spaced at equal distances about the rim secure the selected rim in place. The clamps can be used interchangeably to secure either rim upon the felly band and each clamp is provided with two recesses corresponding to the recesses E' and G' viz., I and J upon the rim engaging side, one of which I as shown in Figs. 5 and 7 receives the edge of the clencher rim and the other J receives the edge of the straight side rim. The clamps are also supplied with inclined extensions H which project between the rim and felly band and spaces the assembled parts.

These engaging or inclined extensions project over the felly band to give a broad bearing thereon and increased strength to the assembled parts and the metal is drawn up at the sides at P, P, to add to the strength of the clamp without increasing its weight.

Each clamp is also provided with a heel K which engages the inwardly turned flange K' of the felly band and upon this heel the clamps find a fulcrum when the nuts are tightened upon the bolts.

Bolts L, L pass through the flange K' and felly L' and are provided with nuts M which serve to tighten the assembled parts. The exact construction of the clamps and nuts is described in a former application.

The inflated tire when put in place holds the ends of the ring tightly together, which makes the assembly easy and when the clamps and wedges which are spaced evenly around the rim are tightened, the rim will fit perfectly upon the felly band and the joints will be incapable of working upon each other.

In Figs. 6 and 7 the preferred shape of the felly band is shown to give a wide seat to the straight side rim and the standard seat to the clencher rim.

In Fig. 7 the sectional view of the clamp H shows the same before the bolt is put in place and nut attached and shows a light and rigid form of construction.

Having described the invention what I claim as new and desire to secure by Letters Patent is:

1. The combination with a transversely split rim and felly band, of plates secured to the rim on opposite sides of the split therein having beveled or dove-tailed edges parallel transversely of the rim and contacting beveled or dove-tailed lugs upon the felly band for engaging said plates.

2. The combination with a transversely split rim and a felly band having a flange, of members secured to the inner side of the rim upon opposite sides of the split therein, said members having a common rim end interlocking member for alining the adjacent ends of the rim and the outer edges of said members being beveled or dove-tailed and means upon said felly band oppositely beveled or dove-tailed for engaging the beveled or dove-tailed edges of said members, the engaging surfaces of said beveled or dove-tailed edges being parallel to each other transversely of the rim.

3. The combination with a transversely split rim and a felly band provided with a flange forming a seat for one edge of said rim, of radially interlocking bearings on said felly band and rim on opposite sides of the split in the latter, said bearings being transversely parallel to permit the free movement of the rim across the felly to find its true bearing upon the seat upon the felly band flange.

In testimony whereof I hereunto set my hand this 9th day of March, 1914.

JOHN KELSEY.

In presence of—
L. H. McCracken,
Wm. M. Monroe.